(12) United States Patent
Liang et al.

(10) Patent No.: US 9,892,038 B2
(45) Date of Patent: Feb. 13, 2018

(54) METHOD, APPARATUS, AND SYSTEM FOR DATA CACHING

(71) Applicant: GUANGZHOU UCWEB COMPUTER TECHNOLOGY CO., LTD., Guangzhou, Guangdong (CN)

(72) Inventors: Jie Liang, Guangzhou (CN); Jian Wu, Guangzhou (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 86 days.

(21) Appl. No.: 15/004,197

(22) Filed: Jan. 22, 2016

(65) Prior Publication Data

US 2016/0259727 A1 Sep. 8, 2016

(30) Foreign Application Priority Data

Mar. 5, 2015 (CN) .......................... 2015 1 0099063

(51) Int. Cl.
*G06F 12/08* (2016.01)
*G06F 12/0804* (2016.01)
*G06F 3/06* (2006.01)

(52) U.S. Cl.
CPC .......... *G06F 12/0804* (2013.01); *G06F 3/065* (2013.01); *G06F 3/0619* (2013.01); *G06F 3/0685* (2013.01); *G06F 2212/1032* (2013.01); *G06F 2212/202* (2013.01); *G06F 2212/281* (2013.01); *G06F 2212/313* (2013.01)

(58) Field of Classification Search
CPC ...... G06F 3/0619; G06F 3/065; G06F 3/0685; G06F 12/0804
USPC ........................................................ 711/142
See application file for complete search history.

(56) References Cited

U.S. PATENT DOCUMENTS 8,239,416 B2* 8/2012 Chirlian ............ G06F 17/30424
705/36 R
2015/0286695 A1* 10/2015 Kadayam ............ G06F 11/1448
707/639

* cited by examiner

*Primary Examiner* — Pierre-Michel Bataille

(57) ABSTRACT

A data caching method is disclosed. The method comprises changing, according to an instruction, a cache value, corresponding to a key, in a cache on a volatile memory, recording the instruction following a first effective content of a log file in a non-volatile memory to obtain a second effective content, the second effective content including the first effective content and the recorded instruction, and storing the key and the changed cache value corresponding to the key into the non-volatile memory.

14 Claims, 11 Drawing Sheets

METHOD, APPARATUS, AND SYSTEM FOR DATA CACHING

CROSS REFERENCE TO RELATED APPLICATION

The present application is based on and claims the benefits of priority to Chinese Application No. 201510099063.1, filed Mar. 5, 2015, published as CN105988899A on Oct. 5, 2016, the entire contents of which are incorporated herein by reference.

TECHNICAL FIELD

The present application relates to methods, apparatus, and systems for data caching.

BACKGROUND

In some applications, such as Internet-related applications, caching, such as distributed caching, has been widely used. The most common examples are memcached and redis, both of which may provide a k-v (i.e., key-value) caching service.

Memcached is non-persistent. If a restart is executed, data cached by memcached will be lost and the application program needs to perform additional steps to reconstruct the data, for example, drawing data from a database and storing into the memcached again.

Although redis is persistent, it has a higher requirement on memory resources in dealing with a large amount of data, and a recovery after a restart is slow. In addition, it may still lose data.

Therefore, it is important to design a new k-v (key value) caching solution, not only persistent, but also capable of quickly reconstructing data in case of a restart.

SUMMARY

One aspect of the present disclosure is directed to a data caching method. The method includes changing, according to an instruction, a cache value, corresponding to a key, in a cache on a volatile memory, recording the instruction following a first effective content of a log file in a non-volatile memory to obtain a second effective content, the second effective content including the first effective content and the recorded instruction, and storing the key and the changed cache value corresponding to the key into the non-volatile memory.

Another aspect of the present disclosure is directed to a data caching method. The method includes changing, according to an instruction, a cache value, corresponding to a key, in a cache on a volatile memory, appending the instruction to an end of an instruction chain of the key, the instruction chain being in a log table on the volatile memory, and storing the key in the log table and the changed cache value corresponding to the second key into a non-volatile memory.

Another aspect of the present disclosure is directed to an apparatus for data caching. The apparatus includes a cache value change module configured to change, according to an instruction, a cache value, corresponding to a key, in a cache on a volatile memory, a log record module configured to record the instruction following a first effective content of a log file in a non-volatile memory to obtain a second effective content, the second effective content including the first effective content and the recorded instruction, and a data backup module configured to store the key and the changed cache value corresponding to the key into the non-volatile memory.

Another aspect of the present disclosure is directed to a non-transitory computer-readable storage medium storing one or more programs. The one or more programs comprises instructions which, when executed by a processor of a computer system, cause the computer system to perform a method. The method comprises changing, according to an instruction, a cache value, corresponding to a key, in a cache on a volatile memory, recording the instruction following a first effective content of a log file in a non-volatile memory to obtain a second effective content, the second effective content including the first effective content and the recorded instruction, and storing the key in the second effective content and the changed cache value corresponding to the key into the non-volatile memory.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Figure 1:
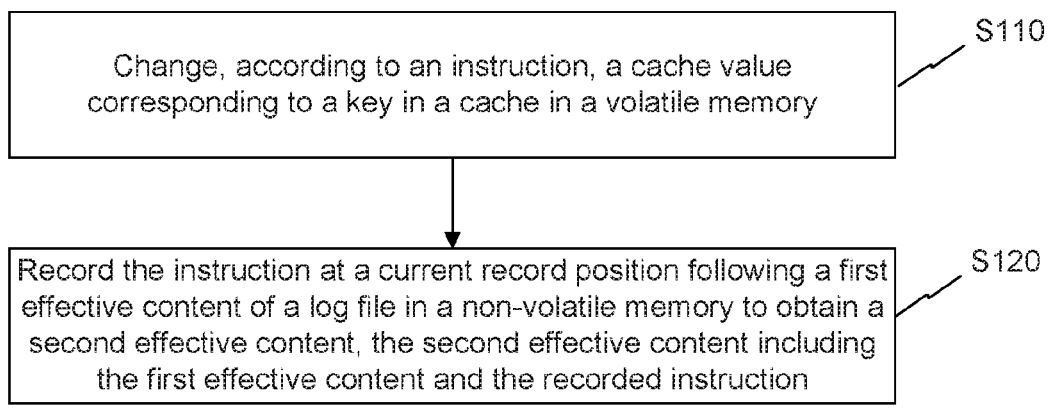
FIG. 1 is a flow diagram illustrating a data caching method, according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In this disclosure, a data caching apparatus may include a processor and a memory. The memory, volatile or non-volatile, may refer to a non-transitory computer-readable storage medium storing instructions, that when executed by the processor, perform the steps described below.

In some embodiments, a method for data caching consistent with this disclosure can include two parts: a data change process of a cache value corresponding to a key in a volatile memory and a data backup process from the volatile memory to a non-volatile memory.

The volatile memory, such as a memory or a read-only memory (ROM), has a high processing speed, can be non-persistent, such that if a power failure or a restart occurs, the data stored in the memory will be lost.

The non-volatile memory, such as a disk, can be persistent, such that the data is not easily lost, but the processing speed may be slower than that of the volatile memory.

One skilled in the art would further understand that, various exemplary logic blocks, modules, circuits and algorithm steps consistent with the disclosure can be implemented as electronic hardware, computer software, or a combination thereof.

The flow charts and block diagrams in the accompanying drawings can illustrate architectures, functions, and operations of possible implementations of the system and method according to the embodiments of this disclosure. Each block in the flow diagram or block diagrams may represent one module, one program segment, or a part of code, and the module, the program segment, or the part of code contains one or more executable instructions for implementing the specified logic functions. In some implementations, the functions associated with the block may occur in a sequence different from that shown in the drawings. For example, two consecutive blocks can be actually executed in parallel substantially, and sometimes executed in a reverse sequence, depending on the function involved. It should also be noted that, each block in the block diagrams and/or the flow charts, as well as a combination of blocks in the block diagrams and/or the flow charts can be implemented by hardware-based systems dedicated for executing the specified functions or operations, or implemented by a combination of dedicated hardware and computer instructions.

FIG. 1 is a flow diagram illustrating a data caching method 10, according to an exemplary embodiment. Method 10 can be performed when an instruction, e.g. data change instruction, is received. A certain predetermined operation/process may be performed on a value corresponding to a key, so as to obtain a new value. The key may be a designated/selected key. The instruction may include, for example, a set instruction (set), a delete instruction (delete), an increment instruction (incr), a decrement instruction (decr), and/or a compare and swap instruction (cas). Method 10 may also be implemented by a computer system comprising a processor and a non-transitory computer-readable storage medium storing instructions.

In response to an instruction, step S110 and step S120 can be executed. The instruction may be a data change instruction. The step S110 and the step S120 can be executed in any sequences or in parallel.

At step S110, the cache value, corresponding to the key, in the cache in the volatile memory is changed.

At step S120, a code representing the instruction is appended/recorded to a current record position following an effective content (referred to as a first effective content) in a log file in a non-volatile memory to become a part of the effective content (referred to as a second effective content), the first effective content including the first key. The log file may be, for example, a binary log file (a binlog file). The instruction can be written into the log file in an appending manner after being serialized into codes. The method of appending and recording the instruction code can be simple and fast and consume less computing resources.

However, if, hypothetically, the appending continues repeatedly, the effective content of the log file may become longer and longer, occupying a larger storage space. Also when the data is reconstructed in a later period, a long effective content of the log file may need to be analyzed, thus consuming more time and resource. Method 200, described below, takes this possibility into consideration.

Figure 2:
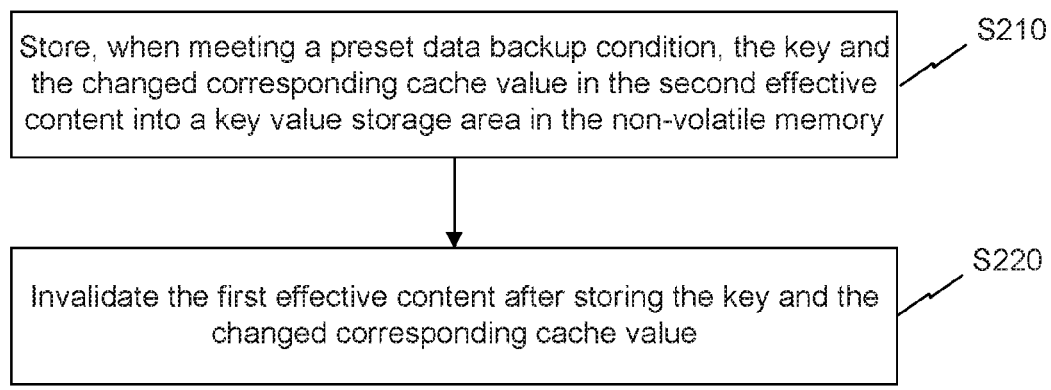
FIG. 2 is a flow diagram illustrating another data caching method, according to an exemplary embodiment.

FIG. 2 is a flow diagram illustrating a data caching method 20, according to an exemplary embodiment. A data backup condition can be pre-set and may include one or more of the following conditions:

reaching a preset time point;

passing a preset time period since the backup operation has been performed last time (since storing the key and the changed corresponding cache value);

the current record position reaching a preset position of the log file;

the (second) effective content of the log file reaching a preset number of log files; and receiving a data backup instruction.

In this way, a variety of data backup conditions can be pre-set as needed.

At step S210, in response to meeting the preset data backup condition, a data backup operation is performed, by storing the key and the changed cache value corresponding to the key into a key value storage area in the non-volatile memory. Step S210 may be performed for each key in the effective content.

In some embodiments, a log type levelDb database system may be used as a storage engine to perform the data backup operation. After the data backup operation has been performed last time and before the data backup operation is performed again, the cache values corresponding to some keys may have been changed several times. When the preset data backup condition is met, only the last implementation result may need to be backed up and the frequency of updating the key value in the non-volatile memory is reduced, thereby reducing the consumed resources.

At step S220, after the data backup operation is completed at step S210, the original (first) effective content of the log file is invalidated. The effective content of the log file can have a start position and an end position. The end position generally can be connected with the current record position. At step S220, the start position of the effective content of the log file may be set as the current record position of the log file, so as to invalidate the original effective content of the log file.

Consistent with this disclosure, after the data backup operation is completed, the effective content of the log file can be invalidated. All the instructions that have been executed after the initial startup (when the data backup operation has not been executed) or since the last time data backup operation can be recorded in the effective content of the log file. Hence, when a data backup is performed, it may be only necessary to store the key in the effective content of the log file and the corresponding cache value into a key value storage area. By this method, all current values in the cache can be stored in the key value storage area.

The key and the corresponding value in the cache during the data backup operation, as well as the instruction executed after the data backup operation, can be stored in the non-volatile memory. By this method, even if all the data in the volatile memory is lost, the data in the cache can also be reconstructed according to the content stored in the non-volatile memory. And data persistence can be reliably realized.

When data reconstruction is performed, the stored value corresponding to the key in the key value storage area can be used as an initial value, and the instruction recorded in the effective content of the log file can be executed in sequence, to obtain the previous cache value of the key in the cache. This step can be repeated for each key.

Every time after each data backup is performed, the effective content of the log file can be reset and recorded again, so that the effective content of the log file will not get bigger. And the instruction for the data reconstruction cannot be excessive. Thus, the data in the cache can be reconstructed quickly, for example during the restart.

In addition, the log file may include a plurality of predefined log sub-files in a preset sequence. Each log sub-file may have a fixed file size. When the last log sub-file in the preset sequence is fully written, the current record position can be adjusted to the start of the first log sub-file in the preset sequence. Through a loop overwriting recording, indefinite extension of the log file can be avoided. The predetermined backup condition may need to enable the data backup operation executed on the previously recorded content in the log file before being overwritten.

The data in the log file can be written in sequence. When a cache value corresponding to a certain key is reconstructed, it may be required to obtain all the effective instructions involving this key in the effective part of the log file, i.e., required random access to log file.

In order to further facilitate the implementation of the backup operation, according to an example consistent with this disclosure, the log table (e.g., a hash table) may be further modified in the volatile memory. According to the key with a corresponding cache value in the cache being changed after last time's backup operation, an instruction chain is modified. This step can be performed for each key.

Figure 3:
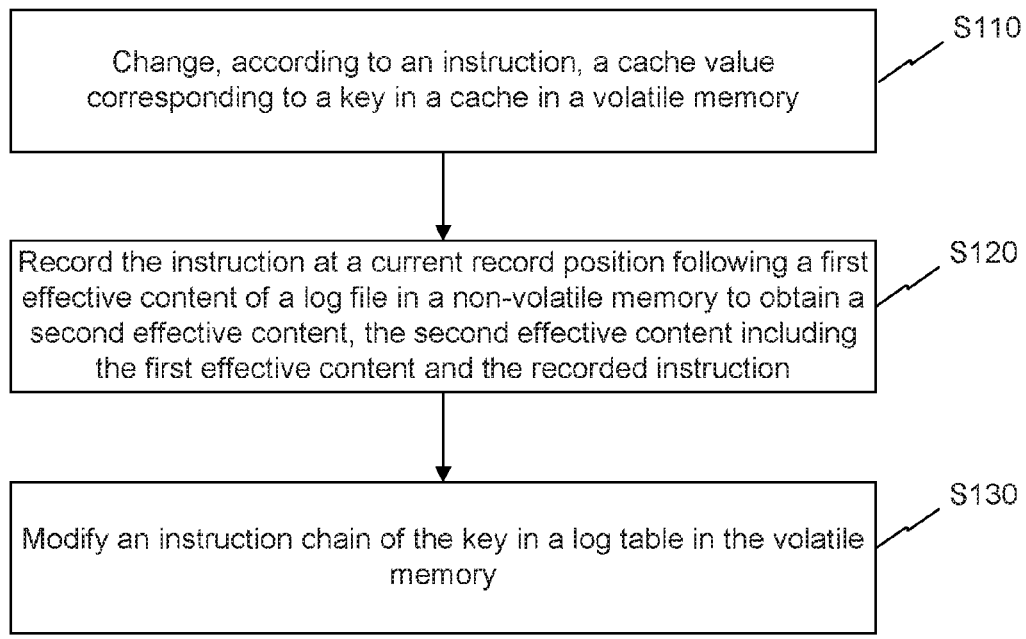
FIG. 3 is a flow diagram illustrating another data caching method, according to another exemplary embodiment.

FIG. 3 is a flow diagram illustrating a data caching method 30, according to an exemplary embodiment. In response to the instruction, except executing steps S110 and S120 described above, step S130 can also be executed. Steps S110, S120, and S130 can be executed in any sequences, or in parallel.

At step S130, the instruction chain of the key in the log table in the volatile memory is modified. For example, the instruction is appended to an end of an instruction chain of the key in a log table in the volatile memory. More examples of this step are described below with reference to FIG. 5.

Figure 4:
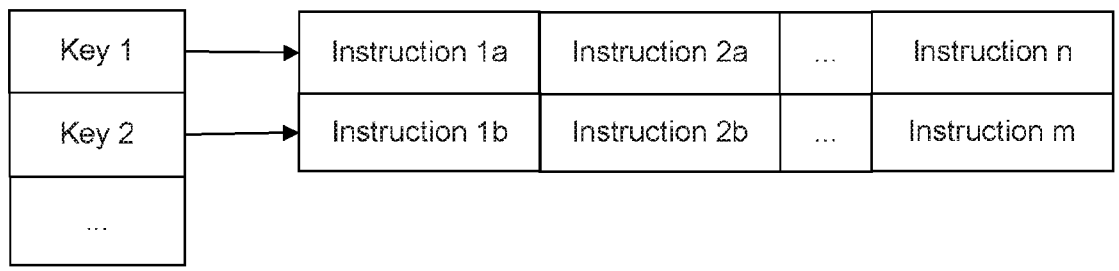
FIG. 4 a block diagram illustrating an instruction chain in a log table, according to an exemplary embodiment.

FIG. 4 is a block diagram illustrating an instruction chain in a log table, according to an exemplary embodiment. According to each key (e.g. key 1 and key 2), the involved Instruction 1a, 1b, Instruction 2a, 2b . . . and Instruction n/m are respectively recorded in sequence.

Figure 5:
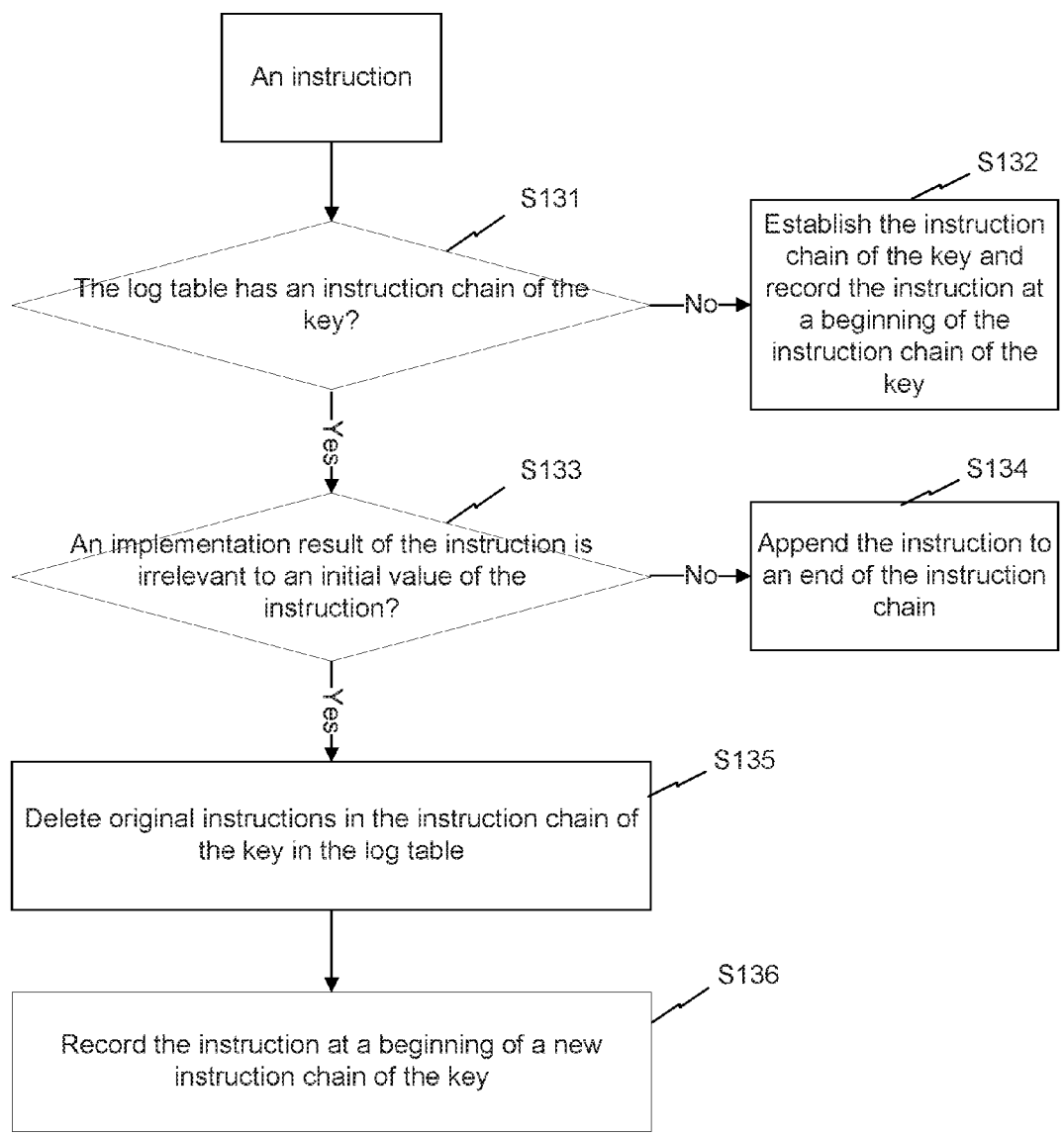
FIG. 5 is a flow diagram illustrating another data caching method, according to an exemplary embodiment.

FIG. 5 is a flow diagram illustrating a data caching method 50, according to an exemplary embodiment. Method 50 can illustrate modifying the instruction chain of the key in the log table in the volatile memory. In response to the instruction, the instruction chain of the key can be modified.

At step S131, whether the instruction chain of the key exists in the log table is determined. If no instruction chain of the key exists in the log table, the method proceeds to step S132.

At step S132, the instruction chain of the key is established in the log table, and the instruction is recorded at the beginning of the instruction chain of the key, i.e., the first instruction of the instruction chain.

If the instruction chain of the key exists in the log table, the method proceeds to step S133. At step S133, whether an implementation result of the instruction is irrelevant to an initial value of the instruction is determined.

The instruction having the implementation result irrelevant to the initial value may include, for example, a set instruction (set), a delete instruction (delete), and so on.

If a determination result of step S133 is no, i.e., the implementation result of the instruction is relevant to an initial value of the instruction, the method proceeds to step S134. At step S134, the instruction is appended to the end of the instruction chain for the key.

If a determination result of step S133 is yes, i.e., the implementation result of the instruction is irrelevant to an initial value of the instruction, the method proceeds to step S135. At step S135, original instructions in the instruction chain of the key in the log table are deleted, and at step S136, the instruction is recorded at the beginning of a new instruction chain of the key, i.e., recorded as the first instruction of the instruction chain.

For example, the current instruction chain of key 1 is "set→incr→incr→decr", and when a "delete" instruction is received, the instruction chain of the key 1 can be changed into "delete" instead of "set→incr→incr→decr→delete."

If the instruction has an implementation result irrelevant to the initial value, the previous instruction may have no effect on calculation and reconstruction of the value in the cache, and may not be kept. Deleting the original instruction chain, can reduce the data amount of the log table, and reduce the amount of the instruction handled during the data reconstruction in a later period.

Figure 6:
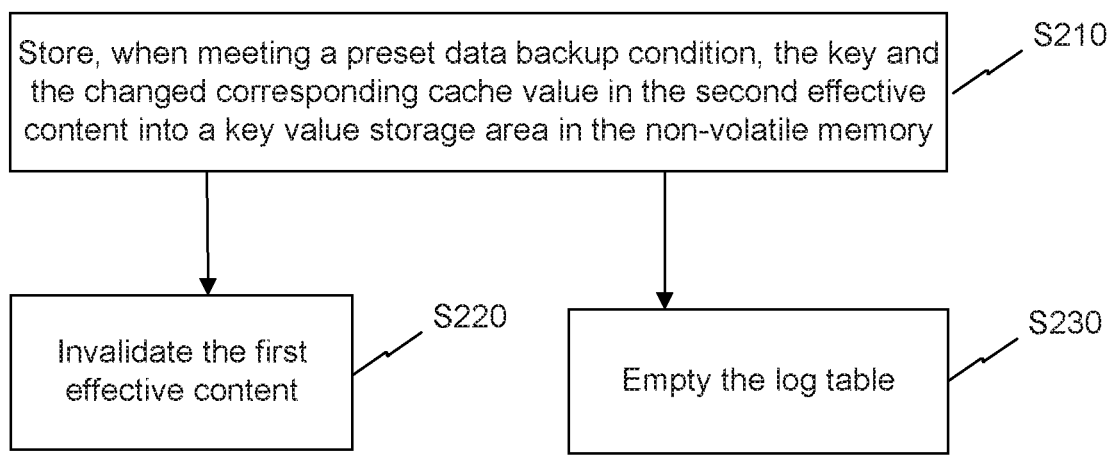
FIG. 6 is a flow diagram illustrating another data caching method, according to an exemplary embodiment.

FIG. 6 is a flow diagram illustrating a data caching method 60, according to an exemplary embodiment. Method 60 can illustrate data backup. After step S210 described above with reference to FIG. 2 and besides the step S220 also described above with reference to FIG. 2, step S230 can be executed. Steps S220 and S230 can be executed in any sequences, or in parallel.

At step S230, the log table is emptied. Since the instruction code in the log file is stored in the volatile memory more convenient for access, at step S210, the data backup operation can be performed according to the log table in the volatile memory instead of the log file in the non-volatile memory. The data backup operation can be performed by storing a cache value in the cache corresponding to the key in the log table into a key value storage area on the non-volatile memory. The step may be repeated for each key in the log table.

In some embodiments, the log table can be modified in the volatile memory, and when the instruction is executed, the instruction chain of the key can be updated. After the data backup operation is performed, the log table can be emptied, such that the instruction chain in the log table is recorded synchronously with the instruction in the log file, i.e., all the instructions that have been executed after the initial startup (when the data backup operation has not been executed) or since the last time data backup operation are recorded in the log table are recorded.

It can be more convenient to access the instruction in the log table in the volatile memory. Moreover, since the instruction of the key is recorded in sequence in the form of the instruction chain, as compared with the log file, it may be faster to obtain the instruction that has been executed for the key.

When the data backup operation is performed, it can be learned from the log table which key(s) in relation to the instruction is/are executed after the initial startup (if the data backup operation has not been executed), or since the last time data backup operation. This method can execute the data backup operation of the key(s), avoiding learning from the log file which key(s) the instruction is executed on.

If data loss in the volatile memory is caused by a power failure or restart, the data can be pre-loaded, i.e., the data in the cache can be recovered according to the data stored in the key value storage area on the non-volatile memory and the instruction recorded in the effective content of the log file. For example, in the above-described case of using the level Db as a storage engine, the reading operation performance of the Level Db may be weaker than the write operation performance. Therefore, it may be desirable to reduce times and complexity of the reading operation.

In some embodiments, an index can be established to quickly locate a block where a stored value corresponding to a key is located, and then the stored value is read out from the block.

In some other embodiments, if the chain head, i.e. the first instruction, of the instruction chain has an implementation result irrelevant to the initial value, reading data from the key value storage area can be avoided.

In some other embodiments, only a part of hotspot data may be pre-loaded into the cache. For example, a part of or all the data may be loaded into the cache according to the data amount in the key value storage area on the non-volatile memory.

Figure 7:
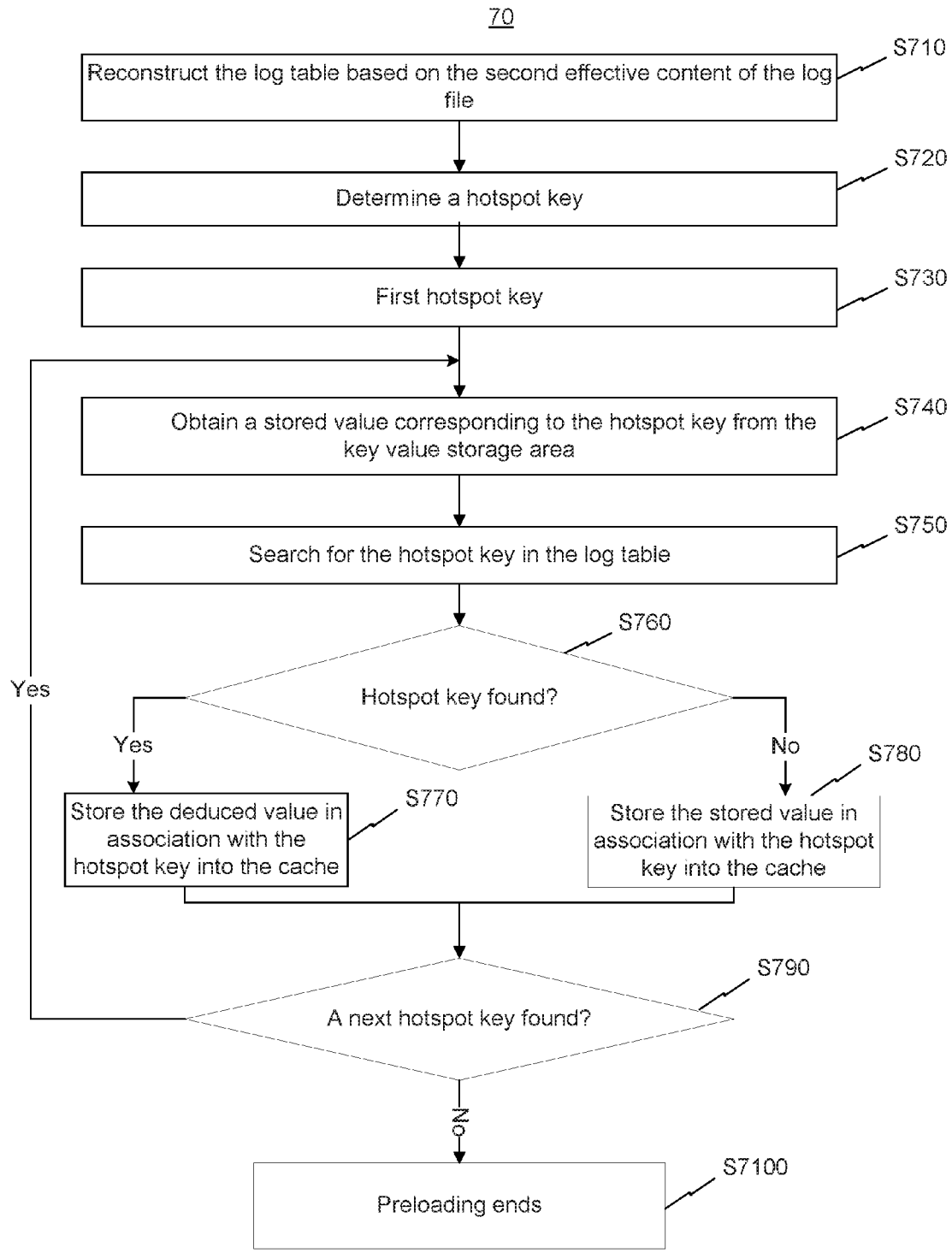
FIG. 7 is a flow diagram illustrating another data caching method, according to an exemplary embodiment.

FIG. 7 is a flow diagram illustrating a data caching method 70, according to an exemplary embodiment. Method 70 can illustrate that a data preloading process may preload the stored value corresponding to a hotspot key. The hotspot key may be a part of a plurality of keys.

In response to a data preloading instruction and if the data in the volatile memory is lost, at step S710, the log table is reconstructed based on the effective content of the log file. All the instructions executed after the initial startup (if data backup operation has not been executed) or since the last time data backup operation may be recorded in the effective content of the log file. An instruction chain can be established for the key involved (the key corresponding to a value for which the instruction has been executed) according to the instruction recorded in the effective content of the log file, recovering the log table in the volatile memory.

At step S710, when the log table is reconstructed based on the effective content of the log file, the effective content of the log file can be firstly determined by obtaining a start position and an end position of the effective part of the log file.

At step S720, hotspot keys are determined. For example, the hotspot keys may be the keys for which a preset number of the instructions are executed at last. For another example, the hotspot keys may be a preset number of keys that are changed at last. For yet another example, the hotspot keys may also be a preset number of keys that are changed the most times.

Since the executed instructions are recorded in the log file in sequence, the hotspot keys can be determined through analyzing the effective content of the log file. The information of the hotspot keys may also be recorded in the key value storage area, so that the hotspot keys can be determined from the key value storage area. The information of the hotspot keys may also be recorded outside the log file on the non-volatile memory and outside the key value storage area, to be used when data is pre-loaded.

At step S730, starting form a first hotspot key, the operations of the Step S740 to the Step S770/S780 are performed in relation to each of the hotspot keys.

At step S740, a stored value corresponding to the hotspot key is obtained from the key value storage area.

At step S750, the hotspot key is searched for in the log table.

At step S760, whether the hotspot key is found in the log table is determined.

If the hotspot key is found in the log table, at step S770, each instruction on the instruction chain of the hotspot key in the log table is sequentially executed on the stored value corresponding to the hotspot key, to obtain a deduced value. The deduced value is stored in association with the hotspot key into the cache.

If no hotspot key is found in the log table, at step S780, the stored value is stored in association with the hotspot keys into the cache.

At step S790, whether a next hotspot key exists is determined. If yes, the method proceeds back to Step S740. If no, the method proceeds to step S7100 and the preloading operation ends.

In some embodiments, not all the data in the cache will be used more than once. Therefore, during data preloading, it may be only necessary to perform data reconstruction specific to the hotspot keys firstly, so as to meet most of the requirements. Moreover, the time required for the data preloading operation can be greatly reduced, thereby improving the efficiency of the data preloading operation.

If step S720 is not performed in the preloading process described above with reference to FIG. 7, and a corresponding operation is performed on both the hotspot keys and all the keys involved in the log table or the log file at steps S730 to S790, a complete preloading can be achieved, i.e., the original data in the cache can be completely recovered.

Figure 8:
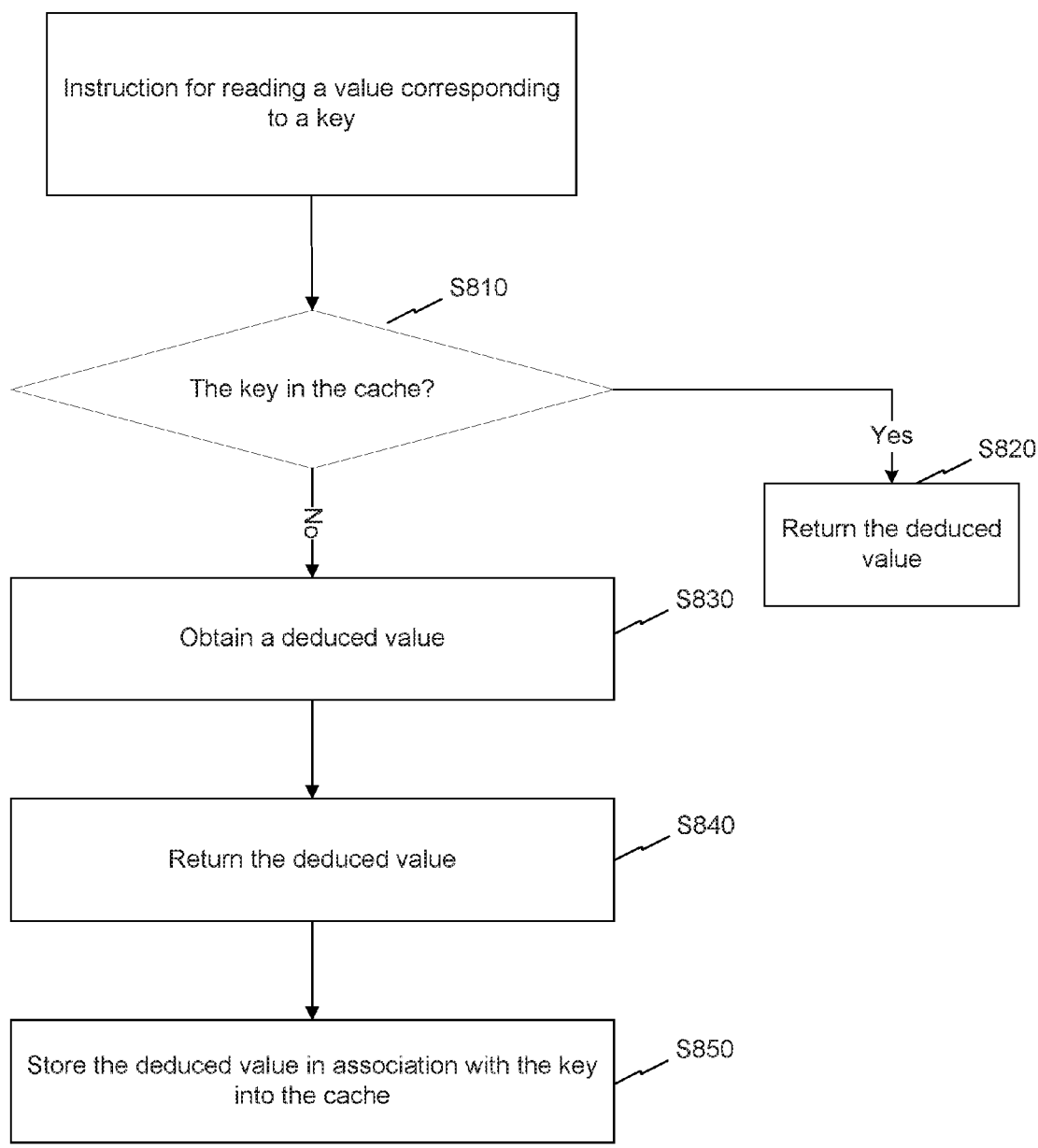
FIG. 8 is a flow diagram illustrating another data caching method, according to an exemplary embodiment.

FIG. 8 is a flow diagram illustrating a data caching method 80, according to an exemplary embodiment. Method 80 can illustrate reading data from the cache after the preloading operation has been performed.

In response to the instruction of reading the value corresponding to the key from the cache, at step S810, whether the key (or the cache value corresponding to the key) exists in the cache can be determined. If yes, it may indicate that no data loss (at least none of that corresponds to the cache value) occurs, or that the cache value has been loaded through, for example, the preloading operation or a previous data reading operation after the data loss. At step S820, the corresponding cache value can be read from the cache, and the cache value can be returned.

If no, i.e., no key (or the cache value corresponding to the key) exists in the cache, at step S830, a deduced value corresponding to the key can be obtained based on the log table and the key value storage area. At step S840, the deduced value is returned. Furthermore, the deduced value can be stored into the cache in association with the key, for future uses.

In some embodiments, if no key exists in the cache, it may indicate that the key is not the hotspot key and that the value corresponding to the key is not pre-loaded during the data preloading. The deduced value can be obtained according to the log table and the key value storage area. Thus, even if a non-hotspot key is used, the corresponding value can be obtained.

Figure 9:
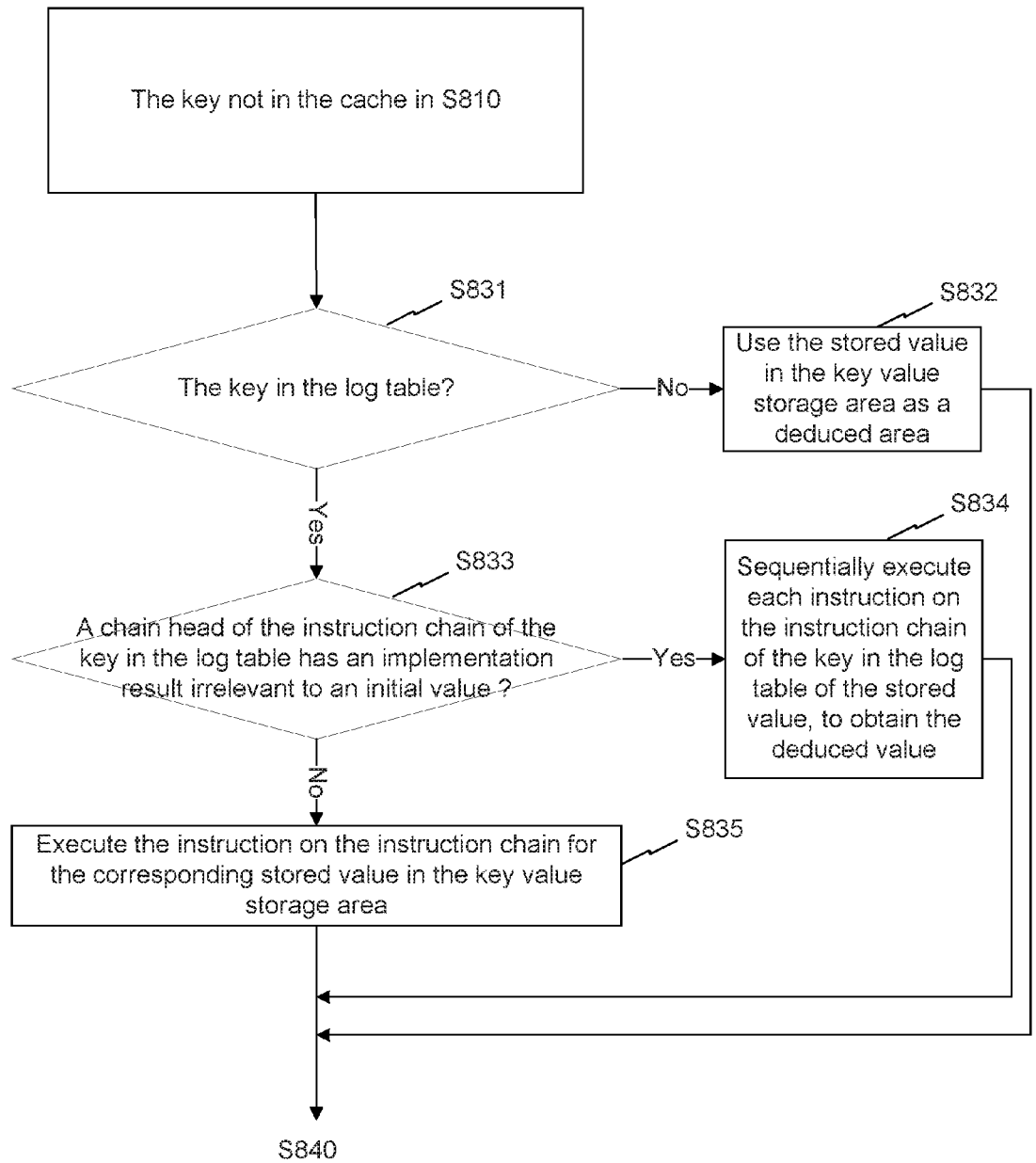
FIG. 9 is a flow diagram illustrating another data caching method, according to an exemplary embodiment.

FIG. 9 is a flow diagram illustrating a data caching method 90, according to an exemplary embodiment. Method 90 may be directed to obtaining a deduced value corresponding to the key based on the log table and the key value storage area. Method 90 may include steps following step S830 described above.

If no key exists in the cache at step S810, at step S831, whether the key exists in the log table can be determined. If no, it may indicate that the operation is not performed to the key after the last data backup operation, such that the stored value in the key value storage area is the latest value. Then, at step S832, the stored value corresponding to the key is obtained from the key value storage area, and the stored value is used as the deduced value. Then, the method proceeds to the step S840 described above.

If yes, i.e., the key exists in the log table, at step S833, whether the chain head of the instruction chain of the key in the log table has an implementation result irrelevant to an initial value is determined. The instruction having an implementation result irrelevant to the initial value may include, for example, a set instruction (set), a delete instruction (delete), and so on.

If the beginning, i.e., the first instruction, of the instruction chain of the key in the log table has an implementation result irrelevant to the initial value, at step S834, the instructions on the instruction chains are executed in sequence to obtain the deduced value. Then, the method proceeds to step S840. Thus, without reading the stored value from the key value storage area, the deduced value can be directly obtained according to the instruction chain. When accessing the key value storage area by, for example, a level Db storage engine, the reading operation can be reduced.

If a determination result of step S833 is no, at step S835, a stored value corresponding to the key is obtained from the key value storage area, and each instruction on the instruction chain of the key in the log table is sequentially executed to the stored value, to obtain the deduced value. Then, the method proceeds to step S840.

An apparatus for data caching consistent with some embodiments of this disclosure is described below with reference to FIGS. 10 to 15. The apparatus and its component modules may comprise processor(s) and computer-readable non-transitory storage medium storing instructions that, when executed by the process, perform the method(s)/step(s) described above with reference to FIGS. 1 to 9.

Figure 10:
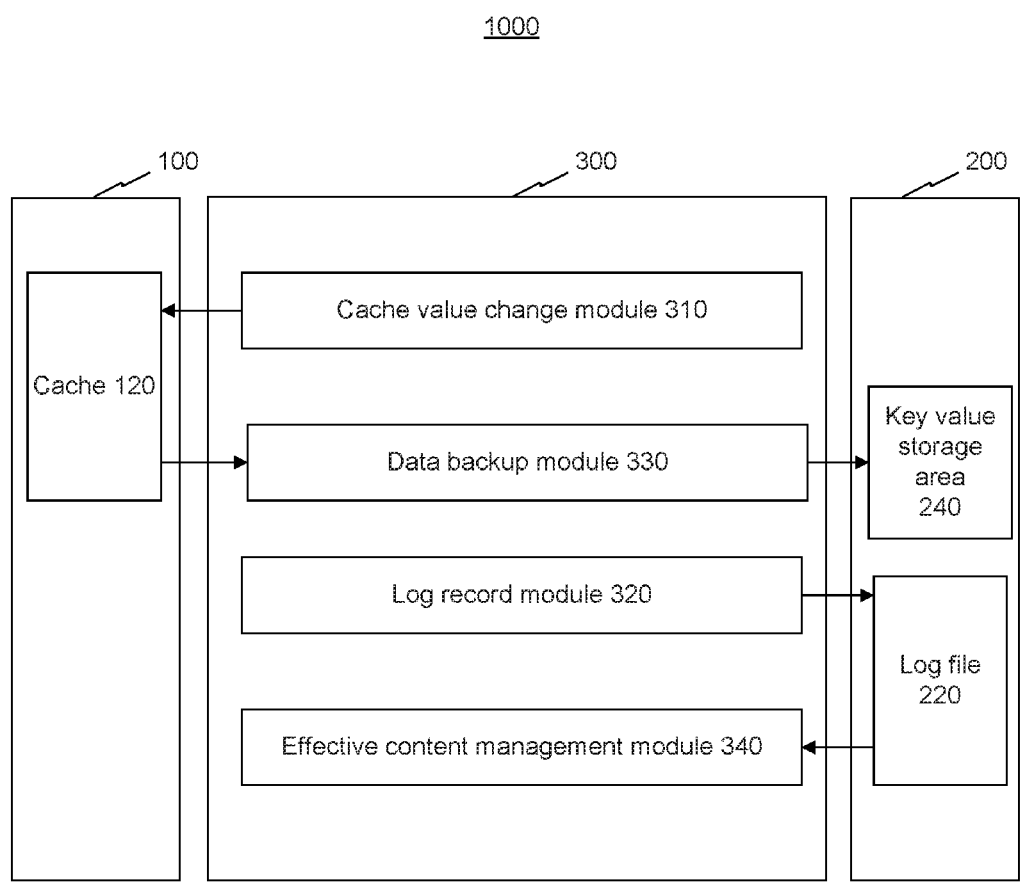
FIG. 10 is a flow diagram illustrating a data caching apparatus, according to an exemplary embodiment.

FIG. 10 is a flow diagram illustrating a data caching apparatus 1000, according to an exemplary embodiment. Apparatus 1000 may include a data caching apparatus 300, a volatile memory 100, and a non-volatile memory 200, for performing the data change process and the data backup process.

According to the data change process and the data backup process, the data caching apparatus 300 may include a cache value change module 310, a log record module 320, a data backup module 330, and an effective content management module 340.

The cache value change module 310 can be configured to, in response to the instruction in relation to the key, change the cache value corresponding to the key, in the cache 120 on the volatile memory 100.

The log record module 320 can be configured to, in response to the instruction in relation to the key, append and record a code representing the instruction to a current record position following an effective content in a log file 220 on a non-volatile memory 200 to become a part of the effective content.

The data backup module 330 can be configured to, in response to meeting the preset data backup condition, perform a data backup operation, i.e., store the key and a cache value in the cache 120 corresponding to the key in the effective content of the log file 220 into a key value storage area 240 on the non-volatile memory 200.

The effective content management module 340 can be configured to, after the data backup module 330 completes the data backup operation, invalidate the original effective content of the log file 220.

The log file 220 may include a plurality of pre-defined log sub-files in a preset sequence. Each log sub-file having a fixed file size. The log record module may include a current record position adjusting module configured to, when the last log sub-file in the preset sequence is fully written, adjust the current record position to the start of the first log sub-file in the preset sequence.

The effective content of the log file 220 may have a start position and an end position. The effective content management module 340 may include a start position setting module (not shown). The start position setting module is configured to set the start position of the effective content of the log file 220 as the current record position of the log file 220, to invalidate the original effective content of the log file 220.

Figure 11:
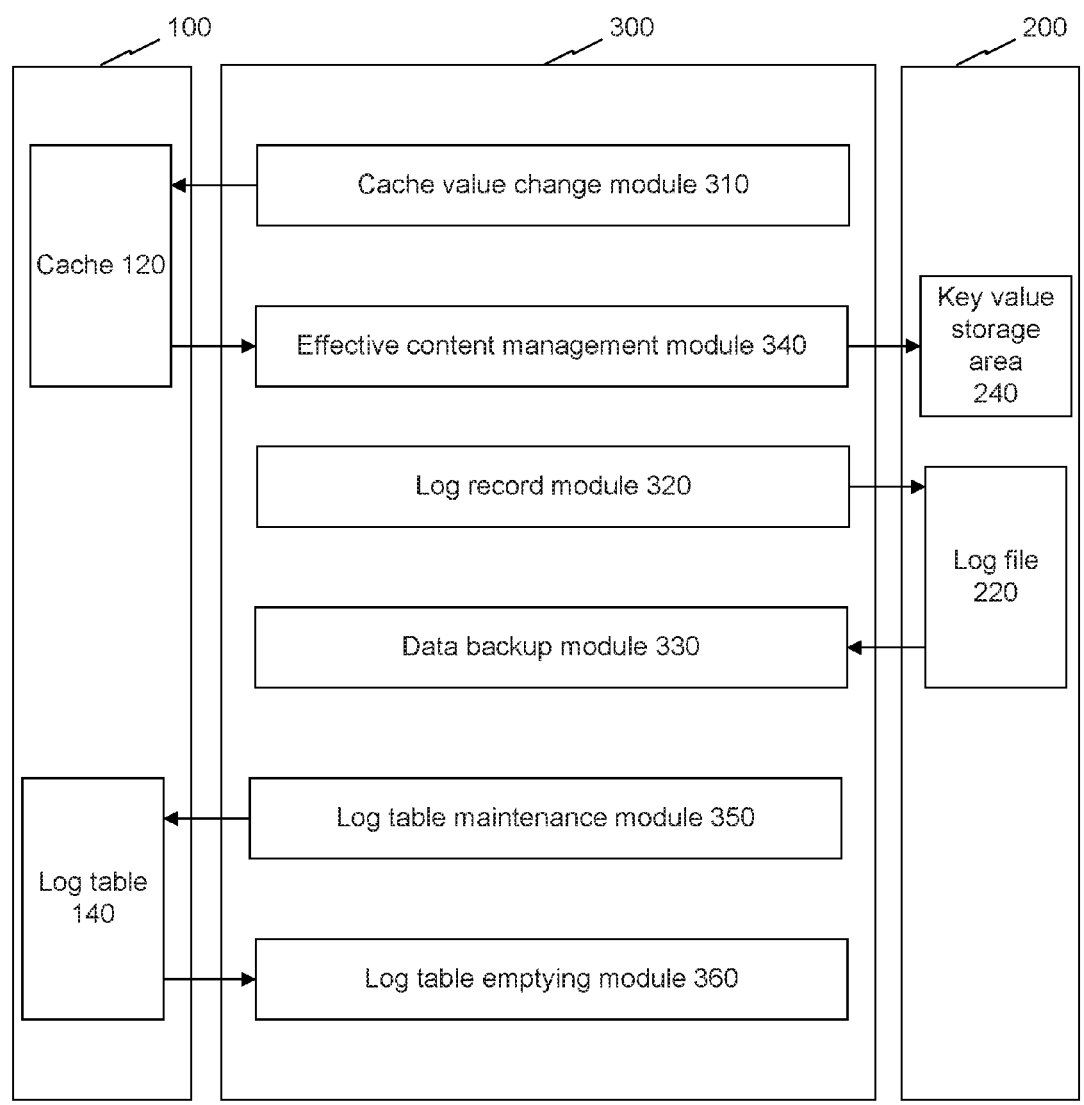
FIG. 11 is a flow diagram illustrating another data caching apparatus, according to an exemplary embodiment.

FIG. 11 is a flow diagram illustrating another data caching apparatus 1100, according to an exemplary embodiment. Apparatus 1100 may include a data caching apparatus 300, a volatile memory 100, and a non-volatile memory 200, for performing the data change process and the data backup process.

According to the data change process and the data backup process, in addition to the cache value change module 310, the log record module 320, the data backup module 330, and the effective content management module 340 as described above, the data caching apparatus 300 may further include a log table maintenance module 350 and a log table emptying module 360.

The log table maintenance module 350 can be configured to, in response to the instruction in relation to the key, modify an instruction chain of the key in a log table 140 in the volatile memory 100, by appending the instruction to the end of the instruction chain.

The log table emptying module 360 can be configured to, after the data backup module 330 completes the data backup operation, empty the log table 140.

The data backup module 330 may perform the data backup operation, by storing the key in the log table 140 and a corresponding cache 120 value into a key value storage area 240 on the non-volatile memory 200. The step may be repeated for each key in the log table.

Figure 12:
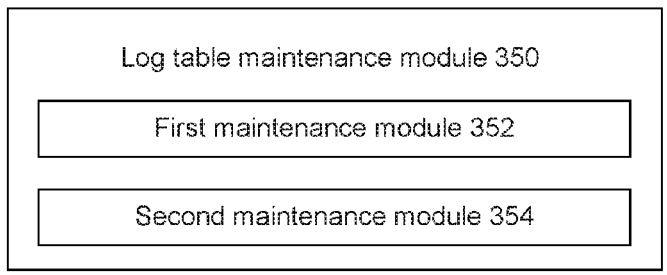
FIG. 12 is a block diagram illustrating a log table maintenance apparatus, according to an exemplary embodiment.

FIG. 12 is a block diagram illustrating a log table maintenance module 350, according to an exemplary embodiment. The log table maintenance module 350 may include a first maintenance module 352 and/or a second maintenance module 354. The first maintenance module 352 may be configured to, if the implementation result of the instruction is irrelevant to an initial value, delete original instructions in the original instruction chain of the key in the log table 140, and to record the instruction at the beginning of the instruction chain of the key. The second maintenance module 354 may be configured to, if no instruction chain of the key exists in the log table 140, establish the instruction chain of the key and record the instruction at the beginning of the instruction chain of the key.

Figure 13:
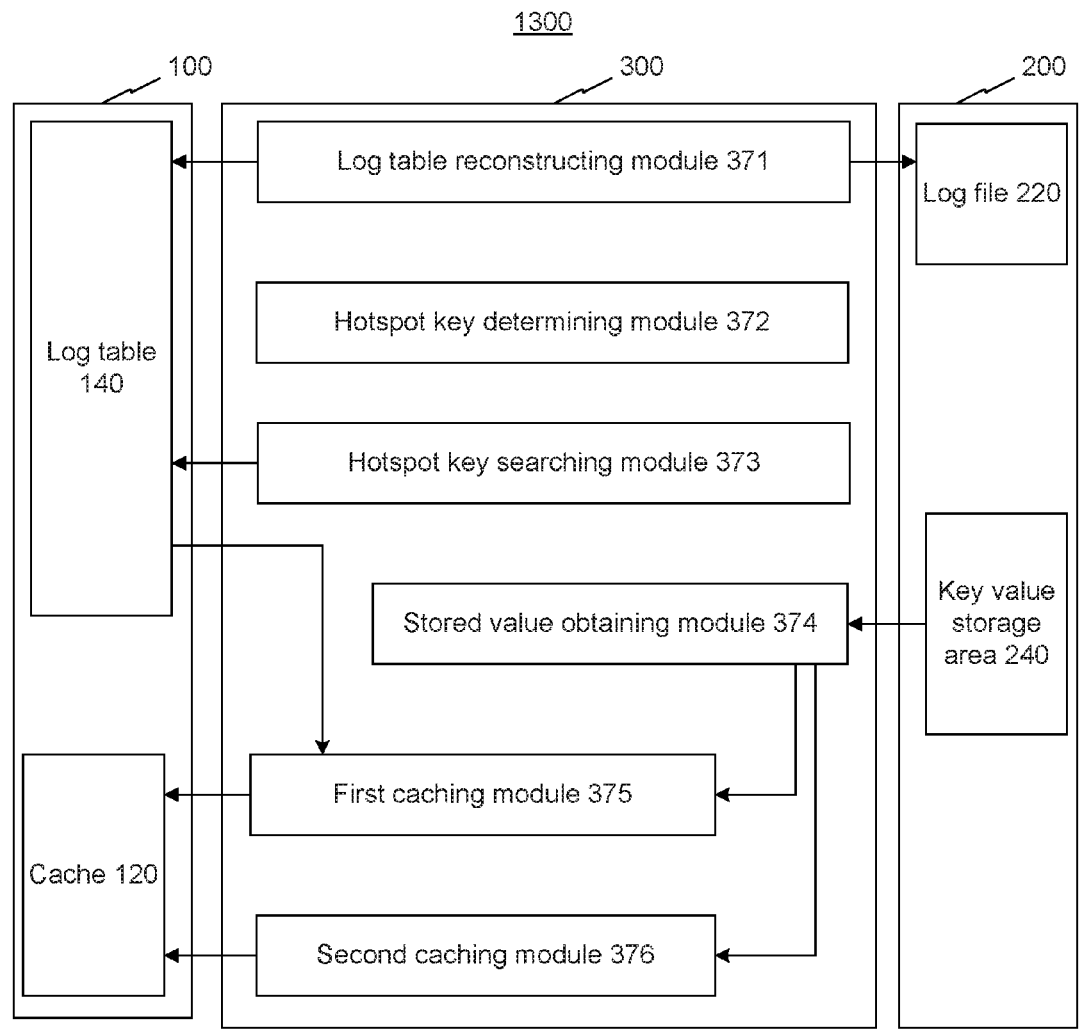
FIG. 13 is a flow diagram illustrating another data caching apparatus, according to an exemplary embodiment.

FIG. 13 is a flow diagram illustrating another data caching apparatus 1300, according to an exemplary embodiment. Apparatus 1300 may perform the data preloading process. Apparatus 1300 may include a data caching apparatus 300, a volatile memory 100, and a non-volatile memory 200.

According to the data preloading process, the data caching apparatus 300 may include a log table reconstructing module 371, a hotspot key determining module 372, a hotspot key searching module 373, a stored value obtaining module 374, a first caching module 375, and a second caching module 376.

The log table reconstructing module 371 can be configured to, in response to the data preloading instruction and if the data in the volatile memory 100 is lost, reconstruct the log table 140 based on the effective content of the log file 220.

For example, the log table reconstructing module 371 may include an effective part determining module (not shown). The effective part determining module can be configured to obtain a start position and an end position of the effective part of the log file 220.

The hotspot key determining module 372 can be configured to, in response to the data preloading instruction, determine the hotspot keys.

The stored value obtaining module 374 can be configured to, according to each hotspot key, obtain stored values corresponding to the hotspot keys from the key value storage area 240.

The hotspot key searching module 373 can be configured to search for hotspot keys in the log table 140 corresponding to each of the hotspot keys.

The first caching module 375 can be configured to, if the hotspot keys are found, sequentially execute each instruction on the instruction chain of the hotspot keys in the log table 140 on the stored values corresponding to the hotspot keys, to obtain deduced values, and store the deduced values in association with the hotspot keys into the cache 120.

The second caching module 376 can be configured to, if no hotspot key is found, store the above stored values in association with the hotspot keys into the cache 120.

Figure 14:
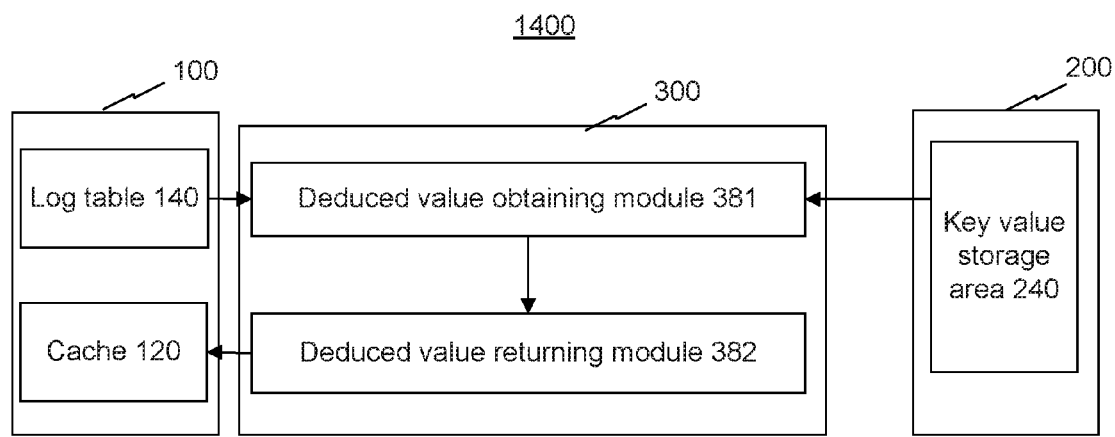
FIG. 14 is a flow diagram illustrating another data caching apparatus, according to an exemplary embodiment.

FIG. 14 is a flow diagram illustrating another data caching apparatus 1400, according to an exemplary embodiment. Apparatus 1400 may include a data caching apparatus 300, a volatile memory 100, and a non-volatile memory 200, for performing the data reading process.

According to the data reading process, the data caching apparatus 300 may include a deduced value obtaining module 381 and a deduced value returning module 382. The deduced value obtaining module 381 can be configured to, in response to the instruction of reading a value corresponding to the key from the cache 120 and if no key exists in the cache 120, obtain the deduced value corresponding to the key based on the log table 140 and the key value storage area 240.

The deduced value returning module 382 can be configured to return the deduced value, and store the deduced value in association with the key into the cache 120.

Figure 15:
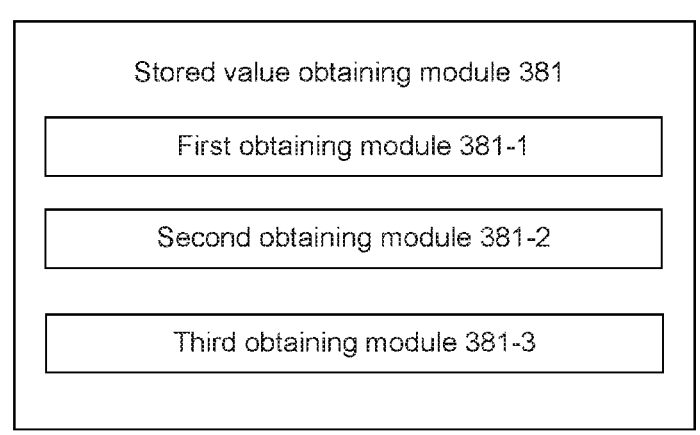
FIG. 15 is a block diagram illustrating a deduced value obtaining apparatus, according to an exemplary embodiment.

FIG. 15 is a block diagram illustrating a deduced value obtaining module 381. The deduced value obtaining module may include a first obtaining module 381-1, a second obtaining module 381-2, and/or a third obtaining module 381-3.

The first obtaining module 381-1 can be configured to, if no key exists in the log table 140, obtain a stored value corresponding to the key from the key value storage area 240, and take the stored value as the deduced value.

The second obtaining module 381-2 can be configured to, if the beginning of the instruction chain of the key in the log table 140 has an implementation result irrelevant to the initial value, sequentially execute the instructions on the instruction chain, to obtain the deduced value.

The third obtaining module 381-3 can be configured to, if the beginning of the instruction chain of the key in the log table 140 does not have an implementation result irrelevant to the initial value, obtain a stored value corresponding to the key from the key value storage area 240, and sequentially execute each instruction on the instruction chain of the key in the log table 140 on the stored value, to obtain the deduced value.

A person skilled in the art can further understand that, various exemplary logic blocks, modules, and algorithm steps described with reference to the disclosure herein may be implemented as electronic hardware, computer software, or a combination of electronic hardware and computer software. For examples, the modules/units may be implemented by a processor executing software instructions stored in the computer readable medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment or a part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on functions involved. Each block in the block diagram and/or flowchart, and a combination of blocks in the block diagram and/or flowchart may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer available storage media (including but not limited to a magnetic disk memory, a compact disc read-only memory (CD-ROM), an optical memory and so on) containing computer available program codes.

Embodiments of the present disclosure are described with reference to flow diagrams and/or block diagrams of methods, devices (systems) and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface and a memory. The memory may include forms of a volatile memory, a random access memory (RAM) and/or non-volatile memory and the like, such as a read-only memory (ROM) or a flash RAM in a computer readable medium. The memory is an example of the computer readable medium.

The computer readable storage medium refers to any type of physical memory on which information or data readable by a processor may be stored. Thus, a computer readable storage medium may store instructions for execution by one or more processors, including instructions for causing the processor(s) to perform steps or stages consistent with the embodiments described herein. The computer readable medium includes non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. The computer readable medium is non-transitory, and does not include transitory media, such as modulated data signals and carrier waves.

The specification has described methods, apparatus, and systems for data caching. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A data caching method, comprising:
   changing, according to an instruction, a cache value, corresponding to a key, in a cache on a volatile memory;
   recording the instruction following a first effective content of a log file in a non-volatile memory to obtain a second effective content, the second effective content including the first effective content and the recorded instruction;
   storing, when meeting a preset backup condition, the key and the changed cache value corresponding to the key into the non-volatile memory;
   invalidating the first effective content; and
   appending the instruction to an end of an instruction chain of the key, the instruction chain being in a loci table on the volatile memory, wherein appending the instruction to the end of the instruction chain of the key comprises at least one of:
   in response to that an implementation result of the instruction is irrelevant to an initial value of the instruction, emptying the instruction chain of the key in the log table and recording the instruction as a first instruction of the instruction chain of the key, or
   in response to that the log table does not have the instruction chain of the key, establishing the instruction chain of the key, and recording the instruction as a first instruction of the instruction chain of the key.

2. The method of claim 1, further comprising, according to a data preloading instruction and if data in the volatile memory is lost:

reconstructing the log table based on the second effective content of the log file;
determining a hotspot key;
obtaining a stored value corresponding to the hotspot key from the non-volatile memory;
searching for the hotspot key in the log table;
if the hotspot key is found, sequentially executing each instruction on an instruction chain of the hotspot key in the log table of the stored value corresponding to the hotspot key to obtain a deduced value, and storing the deduced value in association with the hotspot key into the cache; and
if the hotspot key is not found, storing the stored value in association with the hotspot key into the cache.

3. The method of claim 2, further comprising:
if the cache does not have the key, obtaining, based on the log table and from the non-volatile memory, the deduced value corresponding to the key; and
returning and storing the deduced value in association with the key into the cache.

4. The method of claim 3, wherein obtaining the deduced value corresponding to the key comprises at least one of:
if the log table does not have the key, obtaining the stored value corresponding to the key from the non-volatile memory and using the stored value as the deduced value,
if an implementation result of a first instruction of the instruction chain of the key in the log table is irrelevant to the initial value, sequentially executing the instructions on the instruction chain to obtain the deduced value, or
if the implementation result of the first instruction of the instruction chain of the key in the log table is relevant to the initial value, obtaining a stored value corresponding to the key from the non-volatile memory, and sequentially executing each instruction on the instruction chain of the key in the log table of the stored value, to obtain the deduced value.

5. The method of claim 2, wherein,
reconstructing the log table based on the second effective content of the log file comprises obtaining a start position and an end position of an effective part of the log file; and
invalidating the first effective content of the log file comprises setting the start position of the first effective content of the log file as a current record position of the log file.

6. A data caching method, comprising:
changing, according to an instruction, a cache value corresponding to a key, the cache value being in a cache on a volatile memory, and the key being in the volatile memory;
appending the instruction to an end of an instruction chain of the key, the instruction chain being in a log table on the volatile memory; and
storing the key in the log table and the changed cache value corresponding to the key into a non-volatile memory, wherein appending the instruction to the end of the instruction chain of the key comprises at least one of:
in response to that an implementation result of the instruction is irrelevant to an initial value of the instruction, emptying the instruction chain of the key in the log table and recording the instruction as a first instruction of the instruction chain of the key, or
in response to that the log table does not have the instruction chain of the key, establishing the instruction chain of the key, and recording the instruction as a first instruction of the instruction chain of the key.

7. A data caching method, comprising:
changing, according to an instruction, a cache value, corresponding to a key, in a cache on a volatile memory;
recording the instruction following a first effective content of a log file in a non-volatile memory to obtain a second effective content, the second effective content including the first effective content and the recorded instruction; and
storing, when meeting a preset backup condition, the key and the changed cache value corresponding to the key into the non-volatile memory, wherein:
the log file comprises a plurality of pre-defined log sub-files in a preset sequence, each log sub-file having a fixed file size; and
the preset data backup condition comprises at least one of:
reaching a preset time point;
passing a preset time period since last storing the key and the changed corresponding cache value;
the current record position reaching a preset position of the log file;
the second effective content of the log file having a preset number of log files; or
receiving a data backup instruction.

8. An apparatus for data caching, comprising:
a cache value change module configured to change, according to an instruction, a cache value, corresponding to a key, in a cache on a volatile memory;
a log record module configured to record the instruction following a first effective content of a log file in a non-volatile memory to obtain a second effective content, the second effective content including the first effective content and the recorded instruction;
a data backup module configured to store, when meeting a preset backup condition, the key and the changed cache value corresponding to the key into the non-volatile memory;
an effective content management module configured to invalidate the first effective content; and
a log table maintenance module configured to append the instruction to an end of an instruction chain of the key, the instruction chain being in a log table on the volatile memory, where the log table maintenance module comprises at least one of:
a first maintenance module configured to, in response to that an implementation result of the instruction is irrelevant to an initial value of the instruction, empty the instruction chain of the key in the log table and recording the instruction as a first instruction of the instruction chain of the key, or
a second maintenance module configured to, in response to that the log table does not have the instruction chain of the key, establish the instruction chain of the key, and record the instruction as a first instruction of the instruction chain of the key.

9. The apparatus of claim 8, further comprising:
a log table reconstructing module configured to reconstruct the log table based on the second effective content of the log file;
a hotspot key determining module configured to determine a hotspot key;
a stored value obtaining module configured to obtain a stored value corresponding to the hotspot key from the non-volatile memory;

a hotspot key searching module configured to search for the hotspot key in the log table;

a first caching module configured to, if the hotspot key is found, sequentially execute each instruction on the instruction chain of the hotspot key in the log table of the stored value corresponding to the hotspot key to obtain a deduced value, and store the deduced value in association with the hotspot key into the cache; and a second caching module configured to, if the hotspot key is not found, store the stored value in association with the hotspot key into the cache.

10. The apparatus of claim 9, further comprising:

a deduced value obtaining module configured to, if the cache does not have the key, obtaining, based on the log table and from the non-volatile memory, the deduced value corresponding to the key; and a deduced value returning module configured to return and store the deduced value in association with the key into the cache.

11. The apparatus of claim 10, further comprising:

a first obtaining module configured to, if the log table does not have the key, obtain the stored value corresponding to the key from the non-volatile memory and use the stored value as the deduced value, a second obtaining module configured to, if an implementation result of a first instruction of the instruction chain of the key in the log table is irrelevant to the initial value, sequentially execute the instructions on the instruction chain to obtain the deduced value, or a third obtaining module configured to, if the implementation result of the first instruction of the instruction chain of the key in the log table is relevant to the initial value, obtain a stored value corresponding to the key from the non-volatile memory, and sequentially execute each instruction on the instruction chain of the key in the log table of the stored value, to obtain the deduced value.

12. The apparatus of claim 9, wherein:

the log table reconstructing module includes an effective part determining module configured to obtain a start position and an end position of an effective part of the log file; and the effective content management module includes a start position setting module configured to set the start position of the first effective content of the log file as a current record position of the log file.

13. The apparatus of claim 8, wherein:

the log file comprises a plurality of pre-defined log sub-files in a preset sequence, each log sub-file having a fixed file size; and the log record apparatus includes a current record position adjusting module configured to, when a last log sub-file in the preset sequence is fully written, adjust the current record position to a start of a first log sub-file in the preset sequence.

14. A non-transitory computer-readable storage medium storing one or more programs, the one or more programs comprising instructions which, when executed by a processor of a computer system, cause the computer system to perform a method, comprising:

changing, according to an instruction, a cache value, corresponding to a key, in a cache on a volatile memory;

recording the instruction following a first effective content of a log file in a non-volatile memory to obtain a second effective content, the second effective content including the first effective content and the recorded instruction;

storing, when meeting a preset backup condition, the key and the changed cache value corresponding to the key into the non-volatile memory;

invalidating the first effective content; and appending the instruction to an end of an instruction chain of the key, the instruction chain being in a log table on the volatile memory, wherein appending the instruction to the end of the instruction chain of the key comprises at least one of:

in response to that an implementation result of the instruction is irrelevant to an initial value of the instruction, emptying the instruction chain of the key in the log table and recording the instruction as a first instruction of the instruction chain of the key, or in response to that the log table does not have the instruction chain of the key, establishing the instruction chain of the key, and recording the instruction as a first instruction of the instruction chain of the key.

* * * * *